March 4, 1930. H. H. WELCH Re. 17,609

CARBURETOR

Original Filed Dec. 8, 1916

Inventor
Horace H. Welch.
Williams, Bradbury,
McCaleb & Hinkle Attys.

Reissued Mar. 4, 1930 Re. 17,609

UNITED STATES PATENT OFFICE

HORACE H. WELCH, OF DETROIT, MICHIGAN, ASSIGNOR, BY MESNE ASSIGNMENTS, TO CURTIS B. CAMP, TRUSTEE

CARBURETOR

Original No. 1,578,873, dated March 30, 1926, Serial No. 135,723, filed December 8, 1916. Application for reissue filed December 31, 1927. Serial No. 244,016.

This invention relates to carburetors of the vacuum feed type, i. e., carburetors in which a vacuum in the float chamber is maintained to draw fuel to the said float chamber from a supply tank situated at a lower level.

The particular object of my invention is to provide a vacuum feed carburetor in which the necessary vacuum in the float chamber is produced solely by the aspirating effect of air passing at high velocity through a Venturi or other choke tube. In the ordinary vacuum feed carburetor the vacuum in the float chamber is produced by the vacuum existing in the intake manifold of the connected engine and as a consequence the vacuum in the float chamber is often too high, causing excessive evaporation of fuel, and often too low, as when the engine is running at low speed and full load with wide open throttle. In the improved carburetor hereinafter described the vacuum in the float chamber is produced by connecting the air space of the closed float chamber to the restricted portion of a venturi through which air is passing into the mixing chamber at high velocity, thus maintaining a uniform vacuum in the float chamber which is always sufficient to raise the fuel, and never great enough to cause evaporation of the lighter particles of the fuel. The particular advantage of this means of producing the vacuum in the float chamber lies in the fact that the reduction in pressure at the constricted portion of a venturi is several times greater than at the exit end of the venturi. The latter fact is utilized in this invention to provide a vacuum feed carburetor in which the vacuum in the float chamber is several times greater than the vacuum in the intake manifold of the engine when running at low speed under load. This means that the fuel may be lifted with much less throttling of the engine than is possible with the ordinary type of vacuum feed carburetor.

A further object of my invention is to provide a carburetor having a fairly constant vacuum in the float chamber, thus making it possible to draw fuel from a supply tank at a lower level under all operating conditions.

A further object is to provide a carburetor having a venturi through which air passes at about the same velocity regardless of the total amount of air passing through the carburetor. The purpose of this is to provide a uniform source of vacuum for the float chamber. These and other objects and the several novel features of the invention in its preferred form are hereinafter more fully described and claimed and shown in the accompanying drawings in which—

The device herein shown and described differs from the device in my co-pending application, Serial No. 13,558, principally in that, in the device shown in said pending application, the fuel is supplied in variable quantity to the main air conduit by means of a nozzle situated at or near the point of greatest variation in pressure in the conduit, the variation in pressure being depended upon to vary the flow of fuel in proportion to the variation in the volume of the air passing through the air conduit per unit of time. With the device here shown the atomizer is subjected to substantially constant degree of vacuum, the flow through the fuel conduit being varied or controlled by a metering pin positioned variably in the conduit in accord with variations in the volume of air flowing through the air conduit per unit of time.

Figure 2:
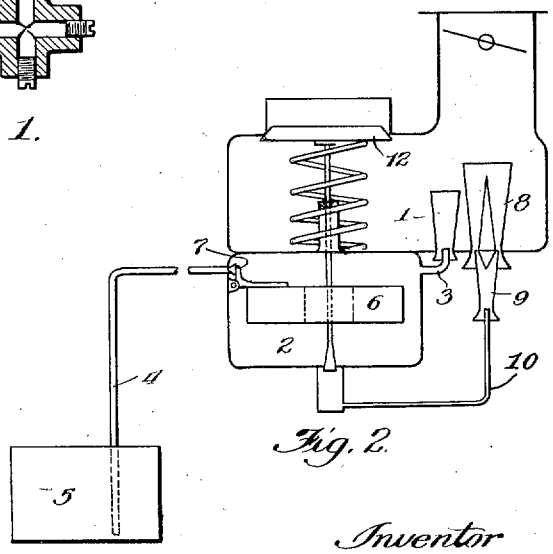
Fig. 2 is a diagram illustrative of the principle of operation involved in my improved carburetor.

The means whereby fuel is fed into the fuel chamber by a degree of vacuum is shown in Fig. 2 in which 1 indicates an air conduit of the general form of a Venturi tube and the upper end of the fuel chamber 2, above the fuel level, is in communication therewith by means of a tube 3 terminating at about the point of greatest restriction in the conduit 1. Whatever degree of vacuum is produced at this point of greatest restriction is likewise produced in the tube and in the air space of the fuel chamber 2 which is in communication with the fuel tank by means of a tube 4. The vacuum produced in the fuel chamber is thus utilized to supply the chamber from the supply tank 5 and the level of fuel in the chamber is controlled by a float 6 of common type operating a valve 7 to close the mouth of the tube 4 when the fuel has reached the desired level. By this arrangement the flow into the fuel chamber ceases upon the closing of the mouth of the tube by the valve. The tube 3 may enter the conduit 1 at any desired point preferably as shown in Fig. 2 with the open end pointing in the direction of flow of air therethrough.

In Fig. 2 is shown a second venturi 8 discharging into the main air conduit and a third venturi 9 discharging into the venturi 8 at the point of greatest restriction therein. A fuel conduit 10 discharges into the venturi 9 at about the point of greatest restriction, the open end of which points in the direction of flow of air therethrough, and this fuel conduit is connected to the bottom of the fuel chamber of the carburetor. The flow of fuel into the conduit from the fuel chamber is controlled by a metering pin which is connected with a valve 12 controlling the air inlet of the main air conduit, a variation in position of which will vary the volume of flow in the fuel conduit, as will be readily understood. By subjecting the air space of the fuel chamber to the aspirating effect of air passing through the venturi 1 and subjecting the fuel of the fuel conduit to the multiple effect of the two venturis 8 and 9, the pressure to which the fuel conduit is subjected is less than that to which the fuel in the fuel chamber is subjected. The difference in pressure produces a flow of fuel into the venturi 9 and consequently, into the main air conduit of the carburetor.

The purpose of the provision of the venturi in the channel between the air space of the fuel chamber and the main air conduit is to reduce the pressure in the fuel chamber below that of the main air conduit producing a greater degree of vacuum in the chamber without resulting in an increased throttling effect on the connected engine, and by pointing the tube 3 in the direction of the flow through the venturi 1 at the point of highest velocity of the air passing therethrough, the maximum reduction in pressure in the float chamber is produced under the given conditions.

Figure 1:
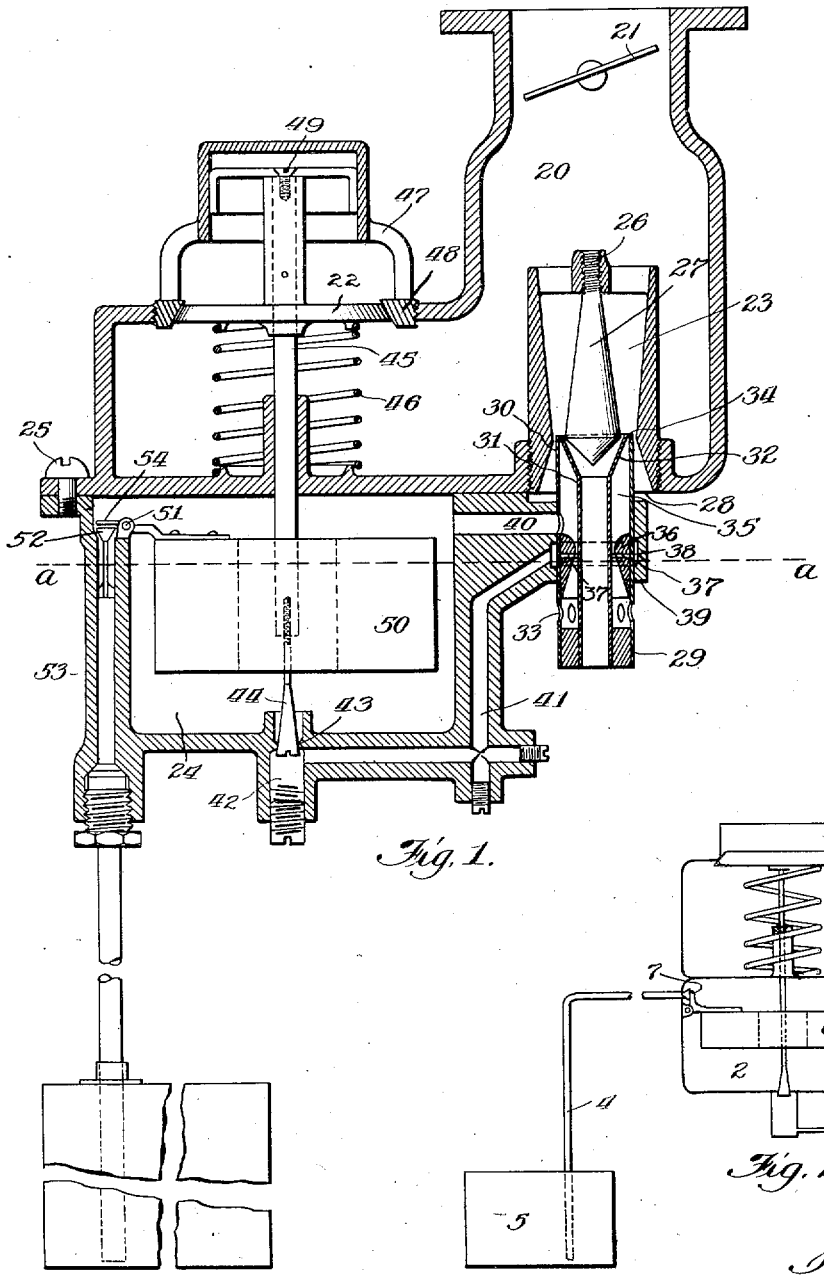
Fig. 1 is a vertical section of the preferred commercial form of a carburetor embodying my invention.

It is to be noted that, in the commercial form shown in Fig. 1, the single venturi is dispensed with and a multiple venturi only is used. In such case the air space is subjected to the degree of vacuum produced by one venturi and the fuel discharge is subjected to the degree produced by both. The diagram Fig. 2 is believed to make clear this differential condition and the general method of operation of the device.

In the preferred commercial form of the invention as shown in Fig. 1, the main air conduit is indicated at 20 and is provided with a throttle valve 21 adjacent the outlet leading into the intake manifold of the internal combustion engine (not here shown). This main air conduit is only open to atmosphere through an inlet normally closed by the spring controlled valve 22 and through an open Venturi tube 23, the preferable form of the conduit and position of this venturi being such that the longitudinal axis of the venturi practically coincides with the longitudinal axis of that portion of the conduit 20 in which it is located and opening in the direction of flow of air therethrough. The valve 22 is positioned in a part of the air conduit directly over the center of the fuel chamber 24 which is secured to the lower side of the conduit 20 by the screws 25. The air conduit 20 is closed to the fuel chamber and the joint between the two parts is made substantially air tight to prevent a flow of air into the fuel chamber therethrough.

The Venturi tube 23 is preferably threaded in an opening in the lower part of the main air conduit 20 and is formed with a boss 26 at the top thereof threaded to receive an end of the conical deflector member 27 terminating near the point of greatest restriction in the venturi 23. The lower end of the venturi is open to atmosphere as indicated at 28 so that air may flow freely thereinto at all times, and a double walled tubular member 29 is also positioned with the discharge end thereto at about the point of greatest restriction in the Venturi tube. This member 29 is formed of an outer cylindrical member 30 and an inner tubular member 31 having a bell shaped outlet 32 into which the conical end of the deflector 27 extends but spaced from the wall thereof substantially as shown. The tube 31 is open to atmosphere at the bottom so that air may flow through the tube 31 and out through the bell shaped discharge end around the deflector. This bell shaped discharge end is also spaced from the end of the surrounding tube 30 as indicated, and air may flow into the conduit 35 formed between the two tubes from the apertures 33 provided therefor. Air rushing into the venturi 23 through the mouth 28 and through the tube 31 passes each side of the ring shaped opening 34 formed between the ends of the two tubes 30 and 31 causing a reduction in pressure in the conduit 35 between the two tubes. This conduit 35 is restricted at a point between the openings 33 and the outlet 34 by means of a portion 36. This portion 36 provides a secondary venturi and has a series of radially positioned channels 37 formed therein extending through the wall of the tube 30. The channels 37 are positioned to register with an encircling channel 38 formed in an extending portion 39 on the fuel chamber.

By the arrangement described air flowing at high velocity through the main venturi 23 from the inlets 31 and 28 tends to produce the greatest possible degree of vacuum in the conduit 35 between the two tubes. The degree of vacuum produced in the radial channels 37 and the surrounding channel 38 is still greater in degree than in the conduit due to the action of the secondary venturi 36.

Between the channels 37 and the end of the conduit 35, a channel 40 opens thereinto leading from the air space at the top of the fuel chamber, and a channel 41 leads from the bottom of the fuel chamber to the channel 38 in communication with the radial channels 37. These channels 37 are slightly above the normal level of the fuel in the fuel chamber, as indicated by dotted lines *a—a* and, by reason of the formation of these channels 37 in the secondary venturi, the fuel in the channel 41 is subjected to a higher degree of vacuum than is produced in the upper end of the fuel chamber. The fuel is thus introduced into the channels or atomizer 37 by difference in pressure and flows into the conduit 35 at a right angle to the direction of flow of air therethrough. It is thus atomized in the tube 35 and is again further broken up on its discharge through the ring shaped discharge end 34 into the main venturi 23.

As heretofore stated, the channel 41 leads into the bottom of the fuel chamber through a vertical conduit 42. This conduit has an inlet aperture 43 after the nature of a valve seat and a pin 44 having a long taper is positioned within this aperture. This pin, under normal conditions and with the valve 22 closed, does not quite contact with the wall of the aperture 43, allowing a flow of fuel therebetween sufficient to supply the engine while idling. At ordinary idling speed of operation of the engine, sufficient air is supplied through the Venturi tube arrangement above described, and this metering pin is unaltered in position and flow is therefore restricted in quantity depending upon the setting of the pin 44. As the volume of air required by the engine per unit of time is increased beyond that which the Venturi tube arrangement is capable of supplying, the increased demand causes sufficient degree of vacuum in the main air conduit 20 to open the valve 22 to a greater or less extent depending upon the demand. This valve 22 is provided with a vertical stem 45 extending through the wall of the conduit 20 and into the fuel chamber and the pin 44 is threaded into the end of this stem so that, upon the valve 22 being depressed to allow a greater volume of air into the air conduit, the metering pin is retracted from the aperture 43 increasing the area of the space between the valve 44 and the surrounding wall by reason of the taper of the pin and thus allowing for an increased flow of fuel through the passageway. As before stated, the taper of the valve is a long taper and is such that the flow is increased in relation to the lift of the valve 22. Thus with an increased volume of air flowing through the conduit per unit of time, the volume of flow of fuel is also increased in proportion to maintain the required percentage of fuel to air flowing into the intake manifold of the engine, and by altering the vertical position of the pin 44 in relation to the seat 43 by screwing it into or out of the end of the stem 45 considerable variation in fuel flow may be produced, as may be required for adjustment.

The valve 22 is normally closed by means of a coiled spring 46 and in order to prevent a fluttering thereof, I preferably employ the valve cage 47 having a ring portion 48 threaded into the wall of the conduit 20 providing a valve seat. The upper end of the cage is chambered and the upper end of the valve stem is provided with a plunger 49 fitting the chamber and forming what may be termed a dash-pot, adapted to prevent fluttering of the valve under variation in pressure in the conduit 20. While this dash-pot arrangement is not essential to the operation of the carburetor I prefer to use an instrumentality of such character to prevent a fluttering of the valve which would affect the flow of fuel into the conduit 41.

The float 50 in the fuel chamber is pivotally supported on the wall thereof, as indicated at 51 and controls a valve 52 seating in the upper end of a channel 53 in communication with the fuel supply tank. The float 50 is centrally apertured to allow the stem of the valve 45 to pass therethrough, and on a fall in the level of fuel the valve 52 may lift due to the vacuum produced by means of the passageway 40 heretofore described which draws the fuel into the chamber. On the fuel reaching normal level the lever 54 connected with the float forces the valve on to the seat and closes the channel 53 to the vacuum produced in the fuel chamber.

By reason of the channel 40 communicating with the Venturi tube at the point of the greatest restriction therein the degree of vacuum produced in the top of the fuel chamber is greater than the degree produced in the main conduit 20. A further decrease of pressure in the conduit 41 is caused by the secondary venturi formed in the conduit 35 below the point of communication of the passageway 40 therewith. The quantity of air passing the secondary venturi is slight in comparison to the discharge capacity of the outlet 34. Thus the pressure in the tube 35 remains practically unaffected by flow through the atomizer.

This arrangement is productive of a considerable vacuum for raising the gasoline from the supply tank to the carburetor and at the same time does not unduly throttle the engine i. e., there is but a slight degree of vacuum in the intake manifold and a considerably higher degree of vacuum in the fuel chamber. The increased degree of vacuum in the fuel chamber, therefore, does not act as a drag on the engine.

From the foregoing description it becomes evident that my improved carburetor is comparatively simple and inexpensive to manufacture and is highly efficient in operation by reason of embodying features of established superiority, as the metering pin controlling the fuel flow in relation to variation in volume of air demanded, and incorporating therewith such an arrangement of parts as to utilize the aspirating effect of air passing through the carburetor to produce a flow of fuel into the fuel chamber thereof and from the fuel chamber to the atomizer. This latter function is performed in the carburetor herein described by subjecting the fuel of the discharge conduit to a less degree of pressure than the fuel in the chamber. It is to be considered within the spirit of this invention as defined in the appended claims, however, to produce a flow of fuel into the atomizer or jet of the carburetor by any approved means in combination with the means for utilizing the aspirating effect to produce a flow of fuel into the fuel chamber.

Having thus fully described my invention, its utility and mode of operation, what I claim and desire to secure by Letters Patent of the United States is—

1. A carburetor comprising a casing, an anterior valve for restricting the flow of air into said casing, a pair of Venturi tubes leading into said casing, a fuel supply reservoir, one of said Venturi tubes having a suction port leading to said reservoir at a point below the fuel level thereof, the other of said Venturi tubes having a suction port leading to said reservoir at a point above the fuel level thereof.

2. A carburetor comprising a casing, an anterior valve for limiting the air passage into said casing, a small Venturi tube extending into said casing and having a suction orifice for the delivery of fuel to said casing, a second Venturi tube extending into said casing and having a suction orifice for the maintenance of a partial vacuum upon the fuel for delivery to the first Venturi tube.

3. A carburetor comprising a casing forming the enclosure for the mixing chamber and its appurtenant air induction chamber, a fuel supply reservoir, a small Venturi tube extending into the chamber of said carburetor appurtenant to the mixing chamber and having a suction opening connecting with the upper spaces of said reservoir, and other means for admitting all of the fuel to said mixing chamber.

4. In a carburetor, the combination with a supply reservoir sealed against atmospheric communication, of a small Venturi tube for the passage of air into the carburetor by the suction of the suction producing means for the carburetor, said Venturi tube being provided with an opening near the throat thereof connecting with the upper space of said reservoir, whereby the partial vacuum created in the upper space of said reservoir will be maintained greater than the partial vacuum in the body of the carburetor and other means conducting all of the fuel into the carburetor.

5. In a carburetor the combination with a body portion forming the main air passage for the carburetor, an anterior and a posterior throttle for said passage, two Venturi tubes leading from atmosphere into said passage, a fuel reservoir, one of said Venturi tubes being connected with the lower part of the fuel reservoir and serving to deliver fuel into said passage, the other of said Venturi tubes being connected with the upper space of said fuel reservoir, and serving to create a partial vacuum therein for raising fuel from a low level source to the fuel reservoir.

6. In a carburetor, the combination with a body forming a main air passage, of a large Venturi tube in said passage, a small fuel delivery Venturi tube having its posterior end located at substantially the point of greatest suction in said large Venturi tube, a fuel reservoir, and a third Venturi tube having its internal end positioned at a point in said passage anterior to the point of maximum suction of the large Venturi tube, said third Venturi tube being connected for producing a partial vacuum in the upper space of the said fuel reservoir.

7. In a carburetor, a chamber adapted to be connected with the intake of an internal combustion engine, two fixed Venturi tubes discharging into said chamber, said Venturi tubes being of different characteristics whereby different degrees of depression obtain therein respectively when the pressure in said chamber is reduced, a constant level liquid fuel chamber, a passageway for liquid fuel leading from below the liquid fuel level in said constant level chamber to the Venturi tube in which the greater depression obtains, and a passageway leading from above the liquid fuel level in said constant level chamber to the Venturi tube in which the lesser depression obtains.

8. In a carburetor, a chamber adapted to be connected with the intake of an internal combustion engine, two fixed Venturi tubes discharging into said chamber, said Venturi tubes being of different characteristics whereby different degrees of depression obtain therein respectively when the pressure in said chamber is reduced, a constant level liquid fuel chamber, a passageway for liquid fuel leading from below the liquid fuel level in said constant level chamber to the Venturi tube in which the greater depression obtains, a passageway leading from above the liquid fuel level in said constant level chamber to the Venturi tube in which the lesser depression obtains, a liquid fuel supply tank in which the level of liquid fuel is below the level of liquid fuel in said constant level chamber, and a fuel supply passageway leading from said supply tank to said constant level chamber.

9. In a carburetor, a chamber adapted to be connected with the intake of an internal combustion engine, two Venturi tubes discharging into said chamber, said Venturi tubes being of different characteristics whereby different degrees of depression obtain therein respectively when the pressure in said chamber is reduced, a constant level liquid fuel chamber, a passageway for liquid fuel leading from below the liquid fuel level in said constant level chamber to the Venturi tube in which the greater depression obtains, a passageway leading from above the liquid fuel in said constant level chamber to the Venturi tube in which the lesser depression obtains, and a suction responsive valve controlling air admission to said chamber.

10. In a carburetor, a chamber adapted to be connected with the intake of an internal combustion engine, two Venturi tubes discharging into said chamber, said Venturi tubes being of different characteristics whereby different degrees of depression obtain therein respectively when the pressure in said chamber is reduced, a constant level liquid fuel chamber, a passageway for liquid fuel leading from below the liquid fuel level in said constant level chamber to the Venturi tube in which the greater depression obtains, and a permanent passageway leading from above the liquid fuel level in said constant level chamber to the Venturi tube in which the lesser depression obtains.

11. In a carburetor, a chamber adapted to be connected with the intake of an internal combustion engine, two Venturi tubes discharging into said chamber, said Venturi tubes being of different characteristics whereby different degrees of depression obtain therein respectively when the pressure in said chamber is reduced, a constant level liquid fuel chamber, a passageway for liquid fuel leading from below the liquid fuel level in said constant level chamber to the Venturi tube in which the greater depression obtains, a passageway leading from above the liquid fuel level in said constant level chamber to the Venturi tube in which the lesser depression obtains, a liquid fuel supply tank in which the level of liquid fuel is below the level of liquid fuel in said constant level chamber, and a fuel supply passageway leading directly from said supply tank to said constant level chamber.

12. In a carburetor, a chamber adapted to be connected with the intake of an internal combustion engine, two Venturi tubes discharging into said chamber, said Venturi tubes being of different characteristics whereby different degrees of depression obtain therein respectively when the pressure in said chamber is reduced, a constant level liquid fuel chamber, a passageway for liquid fuel leading from below the liquid fuel level in said constant level chamber to the Venturi tube in which the greater depression obtains, a passageway leading from above the liquid fuel level in said constant level chamber to the Venturi tube in which the lesser depression obtains, the atmosphere being suitably excluded from said constant level chamber so that the depression in said last named Venturi tube may have effect therein, a liquid fuel supply tank in which the level of liquid fuel is below the level of liquid fuel in said constant level chamber, and a fuel supply passageway leading directly from said supply tank to said constant level chamber whereby the feed of fuel to said constant level fuel chamber is by suction.

13. In a carburetor of the kind described, a mixing chamber, a fuel chamber subject to the suction of the engine through a passage leading thence to the mixing chamber, the juncture of said passage with the mixing chamber being so arranged that the flow of mixture passing through the mixing chamber will, by aspiration, induce in the fuel chamber a higher degree of vacuum than exists in the mixing chamber to assure the supply of fuel to the fuel chamber, and means for delivering fuel into the mixing chamber.

14. In a carburetor, a reservoir for fuel, a chamber adapted to be connected with the intake of an internal combustion engine, two Venturi tubes discharging into said chamber, a closed fuel chamber appurtenant to the carburetor and connected to receive fuel from said reservoir, a passage for liquid fuel leading from said fuel chamber below the level of fuel therein to one of said Venturi tubes for delivery of fuel to said chamber, and a second passage leading from the upper region of the fuel chamber to the other Venturi tube for the withdrawal of air and fuel vapor from the fuel chamber.

In witness whereof, I hereunto subscribe my name this 24th day of December, 1927.

HORACE H. WELCH.